United States Patent
Jin et al.

(10) Patent No.: US 11,888,388 B2
(45) Date of Patent: Jan. 30, 2024

(54) ELECTRIC COMPRESSOR CONTROL DEVICE

(71) Applicant: SANDEN AUTOMOTIVE COMPONENTS CORPORATION, Isesaki (JP)

(72) Inventors: Yunhai Jin, Isesaki (JP); Hiroshi Yoshida, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 446 days.

(21) Appl. No.: 17/276,042

(22) PCT Filed: Sep. 12, 2019

(86) PCT No.: PCT/JP2019/035812
§ 371 (c)(1),
(2) Date: Mar. 12, 2021

(87) PCT Pub. No.: WO2020/071079
PCT Pub. Date: Apr. 9, 2020

(65) Prior Publication Data
US 2022/0052602 A1 Feb. 17, 2022

(30) Foreign Application Priority Data

Oct. 1, 2018 (JP) ................... 2018-186570

(51) Int. Cl.
*H02M 1/32* (2007.01)
*F04B 35/04* (2006.01)
(Continued)

(52) U.S. Cl.
CPC ............ *H02M 1/322* (2021.05); *F04B 35/04* (2013.01); *H02H 7/16* (2013.01); *H02J 7/0029* (2013.01);
(Continued)

(58) Field of Classification Search
CPC ...... H02M 1/322; H02M 7/5387; H02P 23/28; H02P 27/06; F04B 35/04; H02H 7/16; H02J 7/0029; H02J 2207/50
(Continued)

(56) References Cited

U.S. PATENT DOCUMENTS

2015/0021984 A1* 1/2015 Yoon ................ B60L 58/10
307/10.1
2019/0152331 A1* 5/2019 Sawazaki ............ H02M 7/003

FOREIGN PATENT DOCUMENTS

JP   64-089973 A   4/1989
JP   2004-198842 A   7/2004
(Continued)

OTHER PUBLICATIONS

Suzuki (JP 2017060225 A) Inverter Device Date Published Mar. 23, 2017 (Year: 2017).*

(Continued)

*Primary Examiner* — Jorge L Carrasquillo
(74) *Attorney, Agent, or Firm* — Baker Botts L.L.P.

(57) ABSTRACT

To provide a high-voltage apparatus control device capable of judging the connection state of a connector and discharging residual charge in a short time. A control device 1 controls an electric compressor and is provided with an interlock loop 4 annexed to a connector 9 for connecting the electric compressor to an HV battery 17. The control device 1 detects connection/disconnection of the connector 9 on the basis of the state of the interlock loop 4 and forcibly discharges residual charge in an internal smoothing capacitor 14 when disconnection of the connector 9 is detected.

13 Claims, 4 Drawing Sheets

(51) Int. Cl.
- *H02H 7/16* (2006.01)
- *H02P 23/28* (2016.01)
- *H02J 7/00* (2006.01)
- *H02M 7/5387* (2007.01)
- *H02P 27/06* (2006.01)

(52) U.S. Cl.
CPC .......... *H02M 7/5387* (2013.01); *H02P 23/28* (2016.02); *H02J 2207/50* (2020.01); *H02P 27/06* (2013.01)

(58) Field of Classification Search
USPC ........................................................ 318/801
See application file for complete search history.

(56) References Cited

FOREIGN PATENT DOCUMENTS

| | | |
|---|---|---|
| JP | 2011-259517 A | 12/2011 |
| JP | 4898964 B1 | 3/2012 |
| JP | 5135161 B2 | 11/2012 |
| JP | 2014-11959 A | 1/2014 |
| JP | 2015-019561 A | 1/2015 |
| JP | 2015-100241 A | 5/2015 |
| JP | 2015-159110 A | 9/2015 |
| JP | 2017-060225 A | 3/2017 |

OTHER PUBLICATIONS

Japanese Office Action, Application No. 2018-186570, filed May 31, 2022.
Japan Patent Office, International Search Report issued in International Application No. PCT/JP2019/035812, dated Dec. 3, 2019.

* cited by examiner

ELECTRIC COMPRESSOR CONTROL DEVICE

CROSS-REFERENCE TO RELATED APPLICATIONS

This application is a U.S. National Stage Patent Application under 35 U.S.C. § 371 of International Patent Application No. PCT/JP2019/035812, filed on Sep. 12, 2019, which claims the benefit of Japanese Patent Application No. 2018-186570, filed on Oct. 1, 2018, the disclosures of each of which are incorporated herein by reference in their entirety.

TECHNICAL FIELD

The present invention relates to a control device that controls a high-voltage apparatus, such as an in-vehicle electric compressor.

BACKGROUND ART

An electric compressor (high-voltage apparatus) constituting, for example, an air conditioner of a vehicle is connected to a high voltage power supply (HV battery) by a connector (HV connector). If this connector is detached, there is a risk of the occurrence of an accident, such as an electric shock, attributable to the residual charge accumulated in a smoothing capacitor of a control device. Conventionally, therefore, measures have been taken to discharge the residual charge in the smoothing capacitor if the connector is detached and becomes disconnected.

There are a passive method and an active method for discharging the residual charge. Of these, the passive method is a method in which a high power resistor (discharge resistor) is simply connected in parallel with a smoothing capacitor to constantly discharge, while the active method is a method in which the connection state is judged on the basis of a voltage drop (a drop of the HV voltage between a power line and a ground line) when the connector is detached, and the residual charge in the smoothing capacitor is forcibly discharged by a discharge circuit composed of a switch and a resistor, or discharged through motor windings. (refer to, for example, Patent Document 1 and Patent Document 2).

CITATION LIST

Patent Documents

Patent Document 1: Japanese Patent No. 4898964
Patent Document 2: Japanese Patent No. 5135161
Patent Document 3: Japanese Patent Application Laid-Open No. 2014-11959

SUMMARY OF THE INVENTION

Problems to be Solved by the Invention

However, according to the passive method described above, in order to balance discharge time and the self-heating of resistors, a large number of discharge resistors must be connected in parallel to lower a combined resistance value, so that wasteful discharge current always flows between the power line and the ground line, leading to low efficiency and many other problems in terms of mounting space and cost.

On the other hand, according to the active method, the state of a connector is judged by a voltage drop. This has been leading to a risk in that if a voltage is high and a motor is stopped, then it takes time for the voltage to drop to a threshold value, during which an electric shock may occur due to residual charge. There has been another problem in that, if the threshold value is set higher so as to shorten the time, then the risk of the occurrence of false detection increases because of fluctuations due to the switching operations of the switching elements (IGBTs and MOSFETs) constituting an inverter output circuit, that is, fluctuations in current and voltage due to inverter operating conditions, and disturbances (noises, ripples, or the like).

In particular, according to Patent Document 1, a current sensor is provided between a discharge resistor and a smoothing capacitor to judge the connection state on the basis of the direction of current passing therebetween. However, the current passing through the discharge resistor is normally extremely small (up to several hundred mA) as compared with the current passing through a motor (up to several tens of A), so that the current passing through the discharge resistor must be increased to improve detection accuracy. There is another problem in that, if a voltage drops due to a fluctuation in a high-voltage power supply in a merely energized state (a compressor being stopped, a connector being connected, and the high-voltage power supply being ON), then current flows to the discharge resistor, so that the connector is erroneously judged to be in a disconnected state, thus making the method not applicable to the case of the merely energized state.

Meanwhile, one provided with an interlock loop annexed to a connector to detect detachment of the connector has been developed. In this case, when the connector is connected or disconnected (detached), the interlock loop becomes a closed circuit or an open circuit accordingly. Therefore, by judging this state, the disconnection (detachment) of the connector can be detected (refer to, for example, Patent Document 3).

The present invention has been made in view of the conventional circumstances described above, and an object of the invention is to provide a high-voltage apparatus control device capable of judging the connection state of a connector and discharging residual charge in a short time.

Means for Solving the Problems

A control device in accordance with the present invention is adapted to control a high-voltage apparatus, including an interlock loop annexed to a connector for connecting a high-voltage apparatus to a high-voltage power supply, wherein the control device detects connection/disconnection of the connector on the basis of a state of the interlock loop, and in the case where disconnection of the connector is detected, the control device forcibly discharges an internal residual charge.

According to the invention of claim 2, there is provided a high-voltage apparatus control device according to the aforesaid invention, the high-voltage apparatus being an electric compressor that has a motor, including: an inverter output circuit that converts DC power supplied from a high-voltage power supply to AC power to drive the motor; and a smoothing capacitor connected between the inverter output circuit and the connector, wherein upon detection of disconnection of the connector, the control device controls the inverter output circuit so as to forcibly discharge, through a winding of the motor, the residual charge accumulated in the smoothing capacitor.

According to the invention of claim 3, there is provided a high-voltage apparatus control device according to the invention of claim 1, the high-voltage apparatus being an electric compressor that has a motor, including: an inverter output circuit that converts DC power supplied from a high-voltage power supply to AC power to drive the motor; a smoothing capacitor connected between the inverter output circuit and the connector; and a discharge circuit composed of a resistor and a switch connected in parallel with the smoothing capacitor, wherein upon detection of disconnection of the connector, the control device forcibly discharged the residual charge accumulated in the smoothing capacitor by the discharge circuit.

According to the invention of claim 4, there is provided a high-voltage apparatus control device according to the invention of claim 2 or claim 3, including a discharge resistor connected in parallel with the smoothing capacitor in the invention of claim 2 or 3.

According to the invention of claim 5, there is provided a high-voltage apparatus control device according to the invention of any one of claim 2 to claim 4, wherein the control device forcibly discharges the residual charge accumulated in the smoothing capacitor on the basis of a discharge command from an external source.

According to the invention of claim 6, there is provided a high-voltage apparatus control device according to any one of the aforesaid inventions, including: a voltage detection device that detects a voltage between a power line and a ground line of the connector, wherein on the basis of an output of the voltage detection device, the control device judges that an abnormality has occurred in the case where the voltage between the power line and the ground line does not drop to a predetermined value even after the residual charge is forcibly discharged.

According to the invention of claim 7, there is provided a high-voltage apparatus control device according to any one of the aforesaid inventions, wherein the control device is provided in a high-voltage apparatus.

According to the invention of claim 8, there is provided a high-voltage apparatus control device according to any one of the aforesaid inventions, wherein the high-voltage apparatus is an electric compressor mounted in a vehicle.

Advantageous Effect of the Invention

The high-voltage apparatus control device in accordance with the present invention includes an interlock loop annexed to a connector for connecting a high-voltage apparatus to a high-voltage power supply, wherein connection/disconnection of the connector is detected on the basis of the state of the interlock loop, and if disconnection of the connector is detected, then an internal residual charge is forcibly discharged. Therefore, the connection state of the connector can be constantly monitored by using the interlock loop, and if the connector is detached, then the disconnection can be quickly detected from the state of the interlock loop and the internal residual charge can be forcibly discharged.

In other words, as compared with a conventional so-called active method, the control device is independent of operating conditions (voltage and current) and is less susceptible to disturbances (noises, ripples, or the like), thus making it possible to reliably judge the connection state of a connector and to discharge the residual charge in a short time. This enables the occurrence of an electric shock to be effectively eliminated or suppressed, leading to higher safety. In addition, the control device eliminates the need to connect a large number of discharge resistors as in the conventional passive method, thus enabling higher efficiency, a smaller installation space, and lower cost to be achieved.

Here, as in the invention of claim 2, if a high-voltage apparatus is an electric compressor having a motor, and includes an inverter output circuit that converts DC power supplied from a high-voltage power supply into AC power so as to drive the motor, and a smoothing capacitor connected between the inverter output circuit and a connector, then upon detection of disconnection of the connector, the inverter output circuit is controlled and the residual charge accumulated in the smoothing capacitor is forcibly discharged through a winding of the motor, thereby making it possible to discharge the residual charge of the smoothing capacitor in a short time.

In addition, if a discharge circuit composed of a resistor and a switch is connected in parallel with the smoothing capacitor as in the invention of claim 3, and if disconnection of the connector is detected, then the residual charge can be discharged in a short time also by forcibly discharging, by the discharge circuit, the residual charge accumulated in the smoothing capacitor.

Further, if a discharge resistor is connected in parallel with a smoothing capacitor as in the invention of claim 4, then the residual charge of the smoothing capacitor can be discharged also, for example, in the case where the aforesaid forced discharge cannot be performed even when a connector becomes disconnected, in the case where the control device is placed in a sleep state and power to the control device is not yet supplied, or in the case where a high-voltage power supply is cut off while the connector remains connected. In addition, according to the present invention, when such discharge resistors are to be connected, the number of discharge resistors can be reduced to the maximum to minimize discharge in a normal state, in which the connector is connected, thereby making it possible to significantly reduce the installation space and cost and to improve efficiency.

Further, if the residual charge accumulated in a smoothing capacitor is forcibly discharged according to a discharge command from an external source as in the invention of claim 5, then the residual charge of the smoothing capacitor can be discharged as necessary even when the connector is in a connected state.

In addition, if a control device is provided with a voltage detection device that detects a voltage between a power line and a ground line of the connector, and judges that an abnormality has occurred in the case where the voltage between the power line and the ground line does not drop to a predetermined value even after residual charge is forcibly discharged on the basis of an output of the voltage detection device as in the invention of claim 6, then it is possible to detect that, for example, an abnormality has occurred in the detection of connection/disconnection of the connector by an interlock loop.

In particular, providing the control device in a high-voltage apparatus as in the invention of claim 7 makes it possible to detect connection/disconnection of a connector without connecting the interlock loop to a vehicle controller as in the case of, for example, a high-voltage apparatus mounted in a vehicle.

Further, the high-voltage apparatus control device described above is extremely effective when applied to an electric compressor serving as a high-voltage apparatus mounted in a vehicle as in the invention of claim 8.

MODE FOR CARRYING OUT THE INVENTION

The following will describe embodiments of the present invention in detail with reference to the accompanying drawings.

First Embodiment

Figure 1:
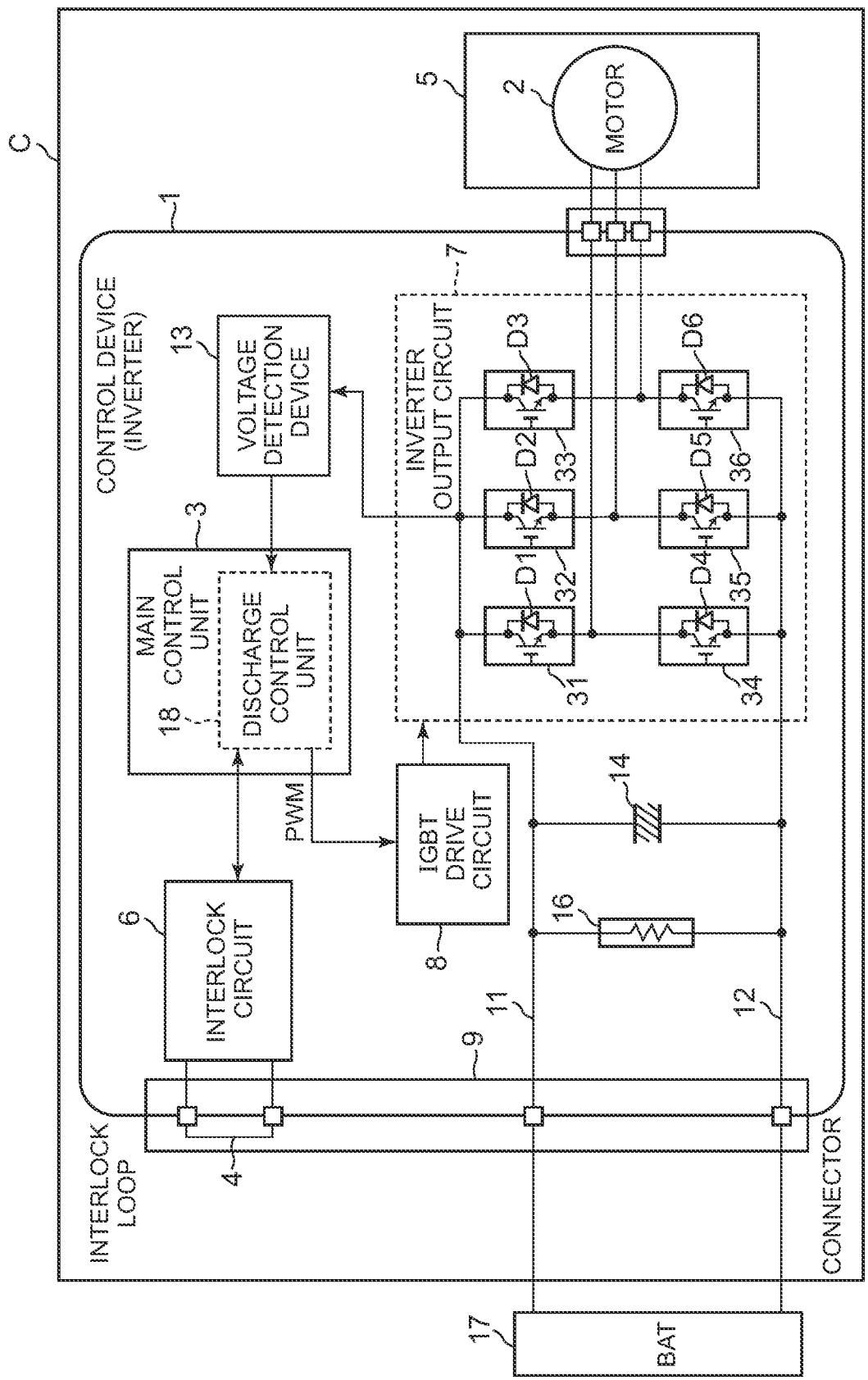
FIG. 1 illustrates the functional blocks of a control device of an electric compressor as an embodiment of a high-voltage apparatus to which the present invention is applied.

FIG. 1 illustrates the functional blocks of a control device 1 of an in-vehicle electric compressor C as a high-voltage apparatus to which the present invention is applied, the electric compressor C constituting an air conditioner of a vehicle. The control device 1 of the present invention is a so-called inverter that controls the operation of a motor 2 of the electric compressor C. The motor 2 is contained together with a compression mechanism unit 5 in a housing of the electric compressor C, and the compression mechanism unit 5 is driven by the motor 2. Further, the control device 1 is provided in an inverter storage compartment formed in the housing of the electric compressor C.

Referring to FIG. 1, the control device 1 of the present embodiment includes a main control unit 3 composed of a microcomputer provided with a microprocessor, an interlock circuit 6 having an interlock loop 4, an inverter output circuit 7 that operates the motor 2, a drive circuit 8 that drives the inverter output circuit 7, a voltage detection device 13 composed of a voltage sensor circuit that detects a voltage (HV voltage value) between a power line 11 and a ground line 12 of a connector (HV connector) 9, a smoothing capacitor 14, and a discharge resistor 16. Further, the control device 1 is connected to an HV battery 17 (DC 300V to 500V) serving as a high-voltage power supply mounted in a vehicle through the connector 9.

The inverter output circuit 7 has an input node thereof connected in parallel between the power line 11 and the ground line 12, and is configured to switch an output (DC power) of the smoothing capacitor 14 to convert the output into three-phase AC (AC power) and supply the converted power to the motor 2. The inverter output circuit 7 of the embodiment is configured by the bridge connection of a plurality of switching elements (IGBTs or MOSFETs, IGBTs being used in the embodiment). The inverter output circuit 7 of the embodiment includes six switching elements 31 to 36 to output the three-phase AC to the motor 2.

More specifically, the inverter output circuit 7 has three switching legs, in which two switching elements are mutually connected in series, and the midpoints of the switching elements 31 to 33 of the upper arms in each switching leg and the switching elements 34 to 36 of the lower arms are individually connected to the windings of the phases (U-phase, V-phase, and W-phase) of the motor 2. Further, freewheeling diodes D1 to D6 are connected in reverse parallel with the switching elements 31 to 36. Further, the inverter output circuit 7 switches the DC power (the output of the smoothing capacitor 14) supplied from the HV battery 17 by turning ON/OFF the switching elements 31 to 36 thereby to convert the DC power into three-phase AC power, which is supplied to the motor 2.

The smoothing capacitor 14 acts as a filter for smoothing the DC power input from the HV battery 17, and is connected between the power line 11 and the ground line 12 between the inverter output circuit 7 and the connector 9. The discharge resistor 16 is provided to discharge the residual charge accumulated in the smoothing capacitor 14 when the vehicle is stopped, is composed of a single resistor (of a high resistance value) or a plurality of parallel resistors (of a high resistance value), and is connected in parallel with the smoothing capacitor 14 between the smoothing capacitor 14 and the connector 9.

Further, the drive circuit 8 triggers the gates of the switching elements 31 to 36 of the inverter output circuit 7 thereby to turn ON or OFF the switching elements 31 to 36 according to PWM command values from the main control unit 3. The voltage detection device 13 detects the voltage between the power line 11 and the ground line 12, and outputs the detected voltage to the main control unit 3. In addition, the main control unit 3 has a discharge control unit 18. The discharge control unit 18 carries out control for forcibly discharging the residual charge of the smoothing capacitor 14. This will be described in detail later.

In addition, the interlock loop 4 is annexed to the connector 9, and is configured such that the loop is closed (closed circuit) when the connector 9 is connected, while the loop is opened (open circuit) when the connector 9 is in a disconnected (detached) state. Further, the interlock loop 4 is connected to the interlock circuit 6, and the interlock circuit 6 is connected to the main control unit 3.

Figure 2:
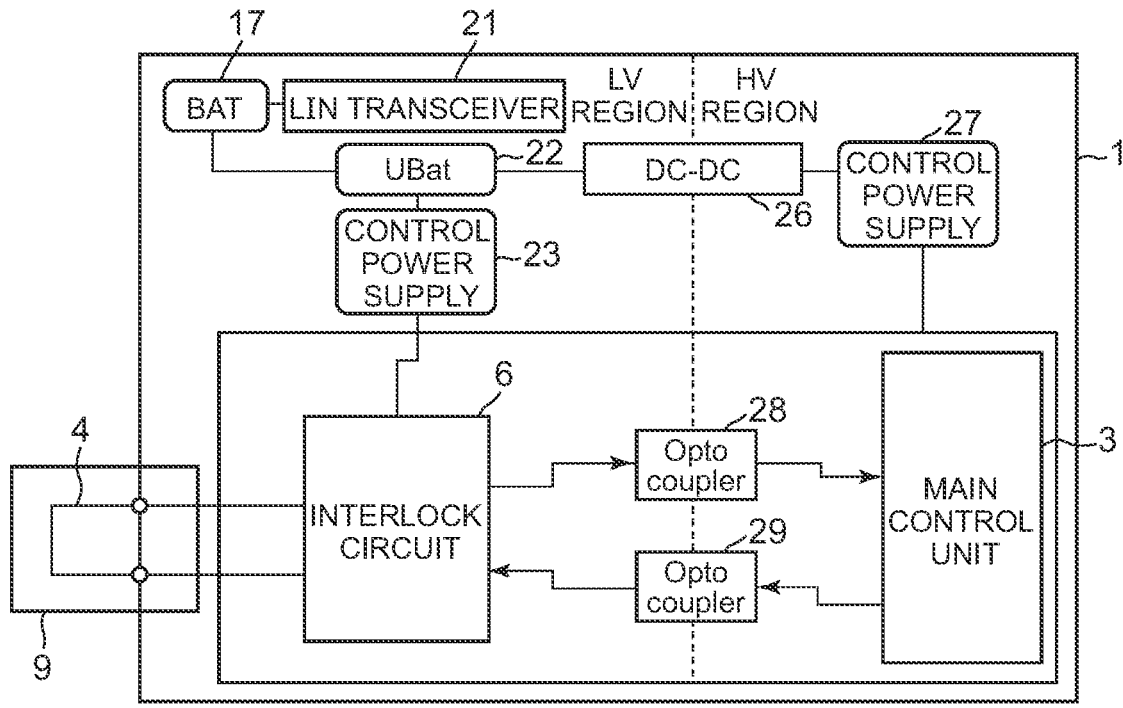
FIG. 2 is a functional block diagram illustrating the operation of an interlock circuit in FIG. 1.
Figure 3:
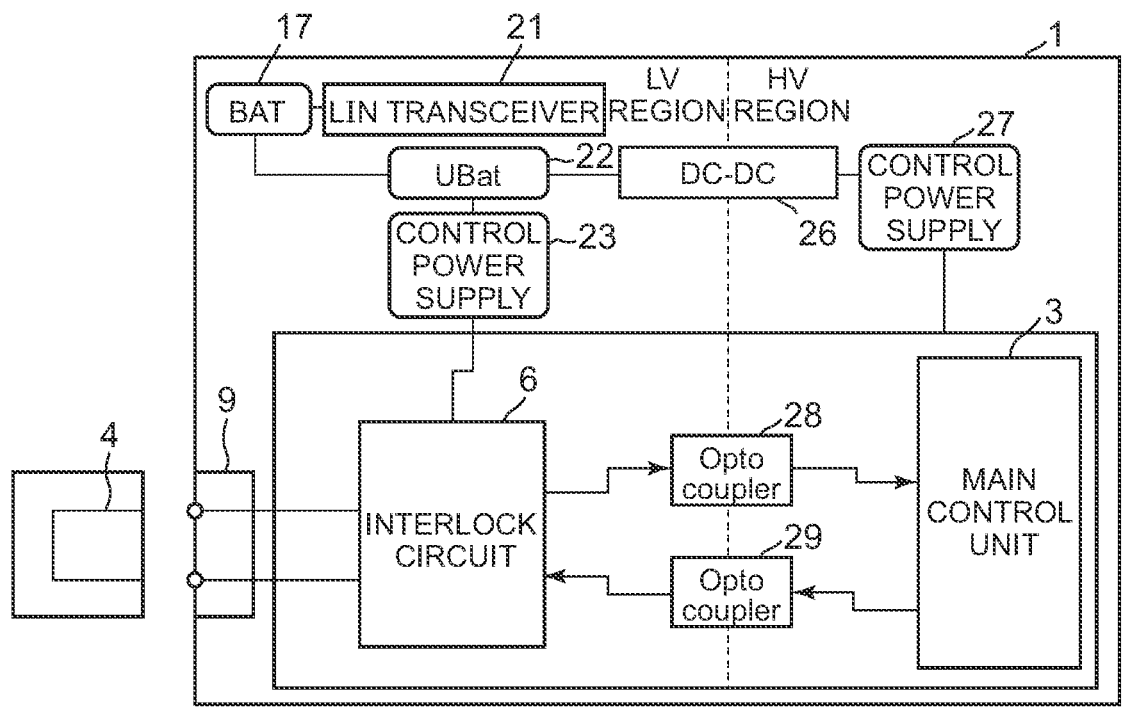
FIG. 3 is a diagram illustrating a connector in FIG. 2 in a disconnected state.

FIG. 2 and FIG. 3 are functional block diagrams illustrating the operation of the interlock circuit 6. In the drawings, a LIN transceiver 21 is connected to a controller (ECU) of a vehicle (not illustrated) through a vehicle communication bus. An LV battery 22 (DC12V) serves as a low-voltage power supply, and a control power supply 23 composed of the LV battery 22 is connected to the interlock circuit 6. A DC-DC converter 26 generates a control power supply 27 of the main control unit 3 and the inverter output circuit 7 from the LV battery 22.

Further, the interlock circuit 6 is connected to the main control unit 3 through optocouplers 28 and 29. In the drawings, the range indicated by the HV region means a high-voltage region, while the range indicated by the LV region means a low-voltage region. In addition, the level of a signal output from the interlock circuit 6 to the main control unit 3 through the optocoupler 28 is configured to be different between the closed circuit, in which the loop of the interlock loop 4 is closed as illustrated in FIG. 2, and the open circuit, in which the connector 9 is disconnected and the loop is opened as illustrated in FIG. 3, thus enabling the main control unit 3 (the discharge control unit 18) to detect whether the connector 9 is connected or disconnected.

In the embodiment, there are two different levels of signals output from the main control unit 3 to the interlock circuit 6 through the optocoupler 29. The main control unit 3 is configured to be capable of detecting a plurality of types of abnormalities associated with the interlock loop 4, including the open circuit and the closed circuit of the interlock loop 4, on the basis of the combination of each signal level and a signal level output at that time from the interlock circuit 6 to the main control unit 3 through the optocoupler 28. Here, only the open circuit and the closed circuit of the interlock loop 4 will be discussed.

The operation for forcibly discharging the residual charge of the smoothing capacitor 14 performed by the discharge control unit 18 of the main control unit 3 in the aforesaid configuration will now be described with reference to the flowchart of FIG. 4. The discharge control unit 18 of the main control unit 3 constantly monitors the state of the interlock loop 4 by the signal level output from the interlock circuit 6 in step S1 of FIG. 4, and judges in step S2 whether a signal level output from the interlock circuit 6 has reached the signal level indicating that the interlock loop 4 has become the open circuit.

Then, when the connector 9 is detached and becomes disconnected, and the open circuit of the interlock loop 4 is detected in step S2, the discharge control unit 18 proceeds to step S3 to first transmit the information that the connector 9 has become disconnected to a higher level controller (ECU) via a vehicle communication bus by the LIN transceiver 21, and to control the inverter output circuit 7 by the drive circuit 8 so as to stop the motor 2.

Next, the discharge control unit 18 acquires, in step S4, the voltage (HV voltage value) between the power line 11 and the ground line 12 of the connector 9 detected by the voltage detection device 13, and judges in step S5 whether the voltage between the power line 11 and the ground line 12 of the connector 9 is equal to or higher than a predetermined discharge target voltage (e.g., a predetermined value of DC60V). If the voltage is equal to or higher than the discharge target voltage, then the discharge control unit 18 proceeds to step S6 to start the HV forced discharge control described below.

In the HV forced discharge control in the present embodiment, the residual charge accumulated in the smoothing capacitor 14 is forcibly discharged through the windings of the motor 2. For example, the discharge control unit 18 first turns the switching element 35 and the switching element 36 ON by the drive circuit 8, and switches the switching element 31, with the switching elements 32 to 34 remaining OFF, to pass the residual charge accumulated in the smoothing capacitor 14 from the U-phase (+) of the windings of the motor 2 to the V-phase (−) and the W-phase (−) thereby to forcibly discharge the residual charge.

Next, the discharge control unit 18 starts, in step S7, a timer incorporated as a function thereof, and judges in step S8 whether a predetermined time (a few ms) has elapsed since the forced discharge was started. The discharge is continued until the predetermined time elapses. Then, the discharge control unit 18 acquires, in step S9, the voltage (HV voltage) between the power line 11 and the ground line 12 of the connector 9 detected by the voltage detection device 13, and judges in step S10 whether the voltage between the power line 11 and the ground line 12 has become equal to or lower than the aforesaid discharge target voltage. If the voltage has become equal to or lower than the discharge target voltage, then the discharge control unit 18 proceeds to step S11 to terminate the HV forced discharge control.

Here, if the voltage between the power line 11 and the ground line 12 of the connector 9 does not drop to the discharge target voltage or lower in step S10, that is, if the voltage between the power line 11 and the ground line 12 does not drop to the discharge target voltage or lower even after the predetermined time elapses since the forced discharge was started, then the discharge control unit 18 proceeds to step S12 to change the discharge route of the motor 2, and proceeds to step S13 to start again the forced discharge operation from step S6 to step S9 described above.

In this case, for example, the discharge control unit 18 turns ON the switching element 32 and the switching element 33 by the drive circuit 8, and switches the switching element 34, with the switching element 31, the switching element 35 and the switching element 36 remaining OFF, thereby forcibly discharging the residual charge accumulated in the smoothing capacitor 14 by passing the residual charge from the V-phase (+) and the W-phase (+) of the windings of the motor 2 to the U-phase (−). Then, in the same manner as described above, the discharge control unit 18 counts in step S7 the timer incorporated as a function thereof, judges in step S8 whether a predetermined time (a few ms) has elapsed since the forced discharge was started, and continues the discharge until the predetermined time elapses. Then, the discharge control unit 18 acquires in step S9 the voltage (HV voltage) between the power line 11 and the ground line 12 of the connector detected by the voltage detection device 13.

Next, the discharge control unit 18 judges in step S14 whether the voltage between the power line 11 and the ground line 12 has become the aforesaid discharge target voltage or lower. If the voltage has become the discharge target voltage or lower, then the discharge control unit 18 proceeds to step S15 to judge that an abnormality has occurred in the discharge circuit of the motor 2, and proceeds to step S16 to transmit the abnormality state to the higher level controller (ECU) via a vehicle communication bus by the LIN transceiver 21.

On the other hand, if the voltage between the power line 11 and the ground line 12 does not drop to the aforesaid discharge target voltage or lower in step S14, then the discharge control unit 18 proceeds to step S17 to judge that an abnormality has occurred in the interlock circuit 6, and proceeds to step S16 to transmit the abnormality state to the higher level controller (ECU) via the vehicle communication bus by the LIN transceiver 21.

Upon receipt of the transmitted abnormality state, the higher level controller (ECU) displays the occurrence of the abnormality state on, for example, a control panel of a vehicle. Examples of the aforesaid discharge circuit abnormality include:
  a. Operation failures of the switching elements 31 to 36 and
  b. Disconnection (open phase) or the like of the motor 2, and examples of the abnormality of the interlock circuit 6 include:
  c. Occurrence of abnormality in the detection of the connection/disconnection of the connector 9 by the interlock circuit 6 on the basis of the state of the interlock loop 4 (erroneous detection of the disconnection of the connector), and
  d. Abnormality of detection of the voltage between the power line 11 and the ground line 12 of the connector 9 by the voltage detection device 13.

Thus, according to the present invention, the control device 1, which controls the electric compressor C serving as a high-voltage apparatus, is provided with the interlock loop 4 annexed to the connector 9 for connecting the electric compressor C to the HV battery 17 (high-voltage power supply), and the connection/disconnection of the connector 9 is detected on the basis of the state of the interlock loop 4. The residual charge in the internal smoothing capacitor 14 is forcibly discharged if the disconnection of the connector 9 is detected. Thus, the connection state of the connector 9 can be constantly monitored by using the interlock loop 4, and if the connector 9 is detached, then the disconnection can be quickly detected from the state of the interlock loop 4, and the internal residual charge can be forcibly discharged.

This makes it possible to reliably judge the connection state of the connector independently of the operating conditions (voltage and current) of the inverter output circuit 7 and being less affected by disturbances (noises, ripples, and the like), to discharge residual charge in a short time, and to effectively eliminate or suppress the occurrence of electric shocks, thus improving safety. In addition, the need to connect a large number of discharge resistors is eliminated, so that efficiency can be improved, and the installation space and cost can be reduced.

In particular, when the high-voltage apparatus is the electric compressor C having the motor 2, and includes an inverter output circuit 7 that converts the DC power supplied from the HV battery 17 into AC power to drive the motor 2, and the smoothing capacitor 14 connected between the inverter output circuit 7 and the connector 9, as with the embodiment, if the disconnection of the connector 9 is detected, then the inverter output circuit 7 is controlled to forcibly discharge, through the windings of the motor 2, the residual charge accumulated in the smoothing capacitor 14, thereby enabling the residual charge of the smoothing capacitor 14 to be discharged in a short time.

In addition, when the discharge resistor 16 is connected in parallel with the smoothing capacitor 14, as with the embodiment, the number of the discharge resistors 16 can be reduced to a maximum, and the discharge in the normal state in which the connector 9 is connected can be suppressed to a minimum, enabling a significant reduction in the installation space and cost and higher efficiency to be achieved.

Further, when a control device includes the voltage detection device 13 that detects the voltage between the power line 11 and the ground line 12 of the connector 9, and is configured to judge that an abnormality as the one described above has occurred if the voltage between the power line 11 and the ground line 12 does not drop to a discharge target voltage (a predetermined value) or lower even after residual charge is forcibly discharged on the basis of an output of the voltage detection device 13, as with the embodiment, it is possible to detect an abnormality, such as the occurrence of an abnormality in the detection of connection/disconnection of the connector 9 by the interlock loop 4.

Further, in the embodiment, the control device 1 is provided in the inverter housing of the electric compressor C, so that the connection/disconnection of the connector 9 can be detected without connecting an interlock loop to a controller of a vehicle.

The present invention is extremely effective when applied to the electric compressor C mounted in a vehicle, as with the embodiment.

Second Embodiment

Figure 5:
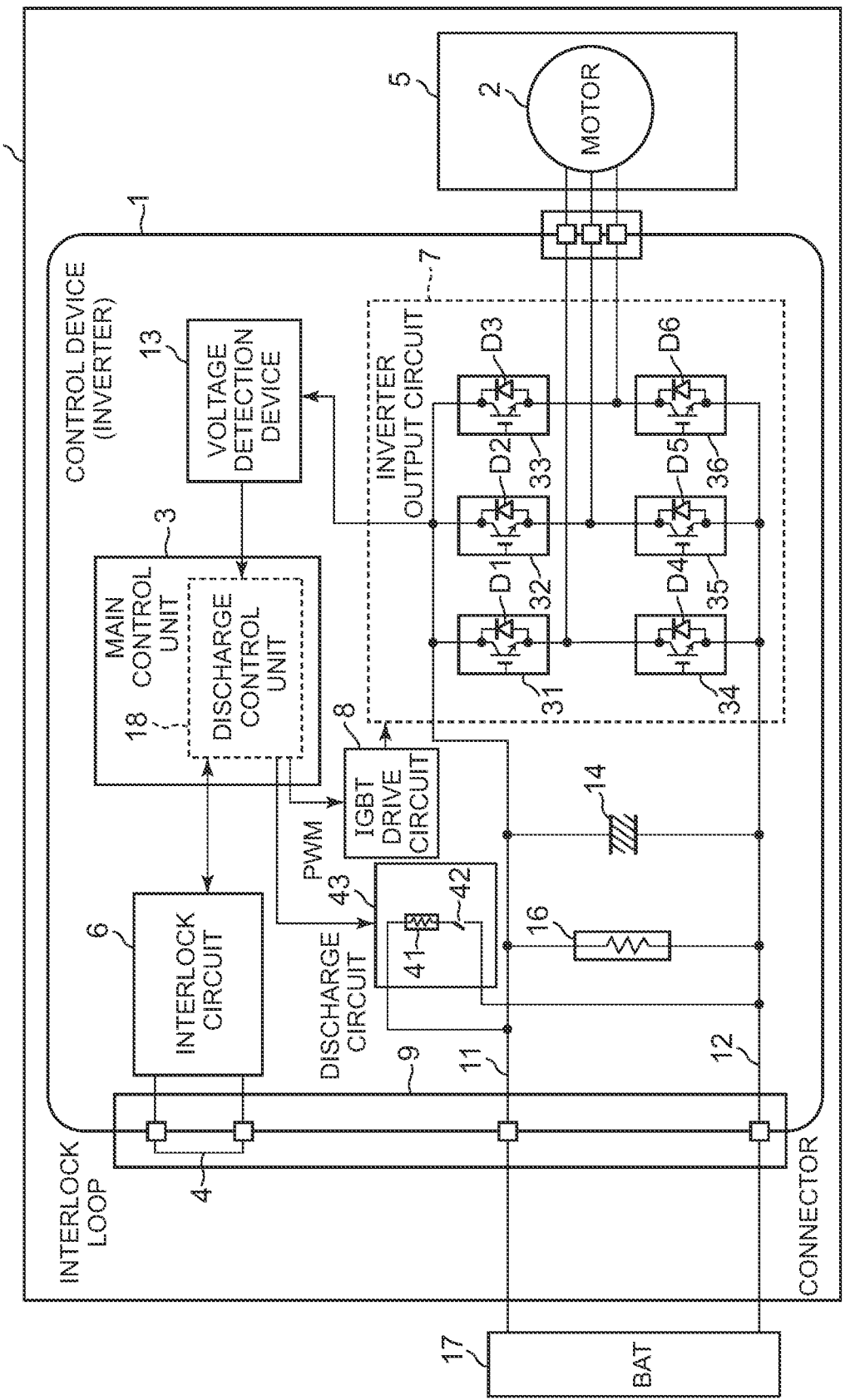
FIG. 5 illustrates the functional blocks of a control device of another embodiment of the present invention.

FIG. 5 is a block diagram of a control device 1 of another embodiment of the present invention. In this drawing, components represented by the same reference numerals as those in FIG. 1 have the same or similar functions. In this embodiment, a discharge circuit 43 composed of a resistor 41 and a switch 42 is connected in parallel to a smoothing capacitor 14 between a power line 11 and a ground line 12 of a connector 9.

Figure 4:
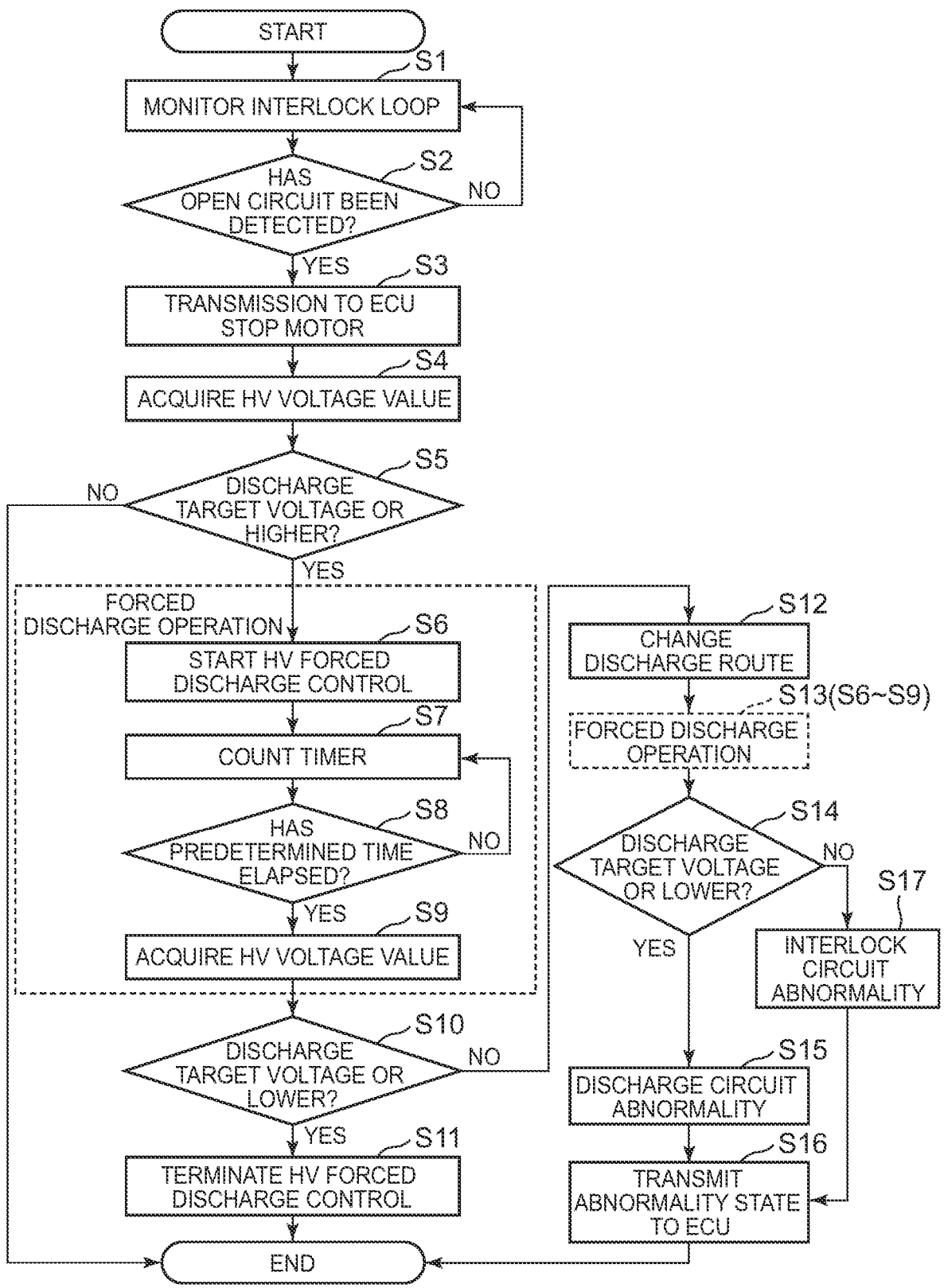
FIG. 4 is a flowchart illustrating the operation of a main control unit in FIG. 1.

Further, in the HV forced discharge control in step S6 of FIG. 4, a discharge control unit 18 of a main control unit 3 in the case of this embodiment closes the switch 42 of the discharge circuit 43 to pass the residual charge accumulated in the smoothing capacitor 14 to the resistor 41 thereby to forcibly discharge the residual charge. In other words, unlike the case of the first embodiment, the residual charge accumulated in the smoothing capacitor 14 is discharged by the discharge circuit 43 rather than being discharged through the windings of the motor 2. The rest of the operation is the same as the case of FIG. 1 to FIG. 4 (the first embodiment).

As this embodiment, if the discharge circuit 43 composed of the resistor 41 and the switch 42 is connected in parallel to the smoothing capacitor 14, and the disconnection of the connector 9 is detected on the basis of the state of an interlock loop 4, then the residual charge can be discharged in a short time also by forcibly discharging, by the discharge circuit 43, the residual charge accumulated in the smoothing capacitor 14.

Even when the connector 9 is in a connected state, the discharge control unit 18 carries out the aforesaid HV forced discharge control if a discharge command is received through a LIN transceiver 21 from a controller (ECU) of a vehicle (an external source). This makes it possible to forcibly discharge, as appropriate, the residual charge of the smoothing capacitor 14 as necessary. The power supplied from an HV battery 17 is cut off in response to an air conditioner OFF signal from the vehicle (an air conditioner being manually turned OFF). The aforesaid HV forced discharge control may be carried out also when the air conditioner is turned OFF.

Further, the present invention has been applied to the control device of the electric compressor as a high-voltage apparatus mounted in a vehicle in the embodiments described above; however, the present invention is not limited thereto, and is effective for various types of high-voltage apparatuses connected to a high-voltage power supply by connectors.

DESCRIPTION OF REFERENCE NUMERALS

C electric compressor (high-voltage apparatus)
1 control device
2 motor
3 main control unit
4 interlock loop
6 interlock circuit
7 inverter output circuit
9 connector
11 power line
12 ground line
13 voltage detection device
14 smoothing capacitor
16 discharge resistor
17 HV battery (high-voltage power supply)
18 discharge control unit
31 to 36 switching element
41 resistor
42 switch
43 discharge circuit

The invention claimed is:

1. An electric compressor control device that controls a the electric compressor that has a motor mounted in a vehicle, comprising:
  an interlock loop annexed to a connector for connecting the electric compressor to a high-voltage power supply,
  an inverter output circuit that converts DC power supplied from the high-voltage power supply to AC power to drive the motor;
  a smoothing capacitor connected between the inverter output circuit and the connector, a voltage detection device that detects a voltage between a power line and a ground line of the connector, wherein the control device detects connection/disconnection of the connector on the basis of a state of the interlock loop, and in the case where disconnection of the connector is detected, the control device implements a forced discharge operation by controlling the inverter output circuit so as to forcibly discharge, through a winding of the motor, the residual charge accumulated in the smoothing capacitor, wherein on the basis of an output of the voltage detection device, the control device starts again the forced discharge operation by changing the discharge route in the case where a voltage between the power line and the ground line does not drop to a predetermined value even after the forced discharge operation is implemented.

2. The electric compressor control device according to claim 1, including a discharge resistor connected in parallel with the smoothing capacitor.

3. The electric compressor control device according to claim 2,
wherein the control device forcibly discharges the residual charge accumulated in the smoothing capacitor on the basis of a discharge command from an external source.

4. The electric compressor control device according to claim 2, which is provided in the electric compressor.

5. The electric compressor control device according to claim 1,
wherein the control device forcibly discharges the residual charge accumulated in the smoothing capacitor on the basis of a discharge command from an external source.

6. The electric compressor control device according to claim 5,
a voltage detection device that detects a voltage between a power line and a ground line of the connector,
wherein on the basis of an output of the voltage detection device, the control device judges that an abnormality has occurred in the case where a voltage between the power line and the ground line does not drop to a predetermined value even after the residual charge is forcibly discharged.

7. The electric compressor control device according to claim 1, which is provided in the electric compressor.

8. The electric compressor control device according to claim 7, which is provided in the electric compressor.

9. The electric compressor control device according to claim 7, wherein the electric compressor is mounted in a vehicle.

10. The electric compressor control device according to claim 1,
wherein the control device judges that an abnormality has occurred in the case where a voltage between the power line and the ground line does not drop to a predetermined value even after the residual charge is forcibly discharged by changing the discharge route.

11. The electric compressor control device according to claim 10, including a discharge resistor connected in parallel with the smoothing capacitor.

12. The electric compressor control device according to claim 10,
wherein the control device forcibly discharges the residual charge accumulated in the smoothing capacitor on the basis of a discharge command from an external source.

13. The electric compressor control device according to claim 10, which is provided in the electric compressor.

* * * * *